United States Patent [19]
Bock et al.

[11] Patent Number: 5,856,412
[45] Date of Patent: Jan. 5, 1999

[54] PROCESS FOR CROSSLINKING THERMOPLASTIC POLYMERS AND CROSSLINKING SYSTEM USED THEREIN

[75] Inventors: Lawrence A. Bock; Roger N. Lewis, both of Longview, Tex.

[73] Assignee: Witco Corporation, Greenwich, Conn.

[21] Appl. No.: 850,334

[22] Filed: May 2, 1997

[51] Int. Cl.$^6$ .............................. C08L 23/30; C08J 3/24; C08F 8/06
[52] U.S. Cl. .................... 525/387; 525/313; 525/338; 525/375; 525/385; 525/386; 525/416; 568/567
[58] Field of Search ................................. 525/387, 385, 525/375, 338, 313; 568/567

[56] References Cited

U.S. PATENT DOCUMENTS

| | | |
|---|---|---|
| 2,776,319 | 1/1957 | Ropp . |
| 3,576,826 | 4/1971 | Bafford et al. . |
| 3,822,317 | 7/1974 | D'Angelo et al. . |
| 3,956,398 | 5/1976 | Schappell . |
| 4,526,916 | 7/1985 | White ....................................... 524/128 |
| 4,638,019 | 1/1987 | Von Gentzkow ........................ 522/104 |
| 4,900,792 | 2/1990 | Chen ....................................... 525/264 |
| 4,956,416 | 9/1990 | Sanchez . |
| 5,004,780 | 4/1991 | Matsuyama et al. . |
| 5,260,381 | 11/1993 | Needham ................................. 525/193 |
| 5,272,219 | 12/1993 | Sanchez . |
| 5,304,649 | 4/1994 | Sanchez et al. . |
| 5,360,867 | 11/1994 | Sanchez . |
| 5,387,654 | 2/1995 | Sanchez et al. . |
| 5,399,630 | 3/1995 | Sanchez ................................ 525/327.6 |
| 5,539,061 | 7/1996 | Kazmierczak ........................... 525/387 |

*Primary Examiner*—Fred Zitomer
*Attorney, Agent, or Firm*—Timothy X. Witkowski; Edward K. Welch; Andrew S. Reiskind

[57] ABSTRACT

A crosslinking system which includes a 1,2,4-trioxacycloheptane and a crosslink-promoting polyfunctional ethylenically unsaturated compound. This system is employed in a process of crosslinking a thermoplastic polymer. Preferred polymers, useful in this process, include ethylene homopolymers and copolymers.

24 Claims, No Drawings

PROCESS FOR CROSSLINKING THERMOPLASTIC POLYMERS AND CROSSLINKING SYSTEM USED THEREIN

BACKGROUND OF THE DISCLOSURE

1. Field of the Invention

The present invention is directed to a process for crosslinking a thermoplastic polymer and to a crosslinking system, a cyclic peroxide and co-agent therefor, used therein. More specifically, the present invention is directed to a process of crosslinking a thermoplastic polymer by contacting it with a crosslinking system which includes a cyclic seven-membered peroxide compound and a crosslink-promoting polyfunctional ethylenically unsaturated compound.

2. Background of the Prior Art

The utilization of compounds having peroxy functionality to crosslink thermoplastic polymers is well established in the art. That there are so many peroxide compounds utilized in this application gives evidence of the variety of thermoplastic polymers subject to crosslinkage.

Independent of the identity of the thermoplastic polymer subject to crosslinkage there are three properties commonly sought in all peroxide compounds employed in this use. These properties are, indeed, independent of the peroxide compound's suitability as a crosslinking agent. The first of these is shelf-life stability. This is a threshold requirement. It would not do well to utilize a peroxide having excellent crosslinking properties which degrades prior to use.

The second of these properties is ease of synthesis. Obviously, the easier the synthesis, as measured by the number of steps required to produce the peroxide, the yield of each step, the level of difficulty associated with separating the product from the reaction mixture and the like, the lower will be the cost of the peroxide.

Finally, the third desired property, directly related to the specific function to which the peroxide is put, thermoplastic polymer crosslinkage, is onset temperature. Onset temperature is the temperature at which uncontrolled decomposition begins. The onset temperature of a peroxide must be such that at the temperature at which the thermoplastic polymer is to be crosslinked, the peroxide undergoes decomposition at a rate sufficient to effect such crosslinking in a reasonable period of time.

A class of peroxide compounds that meets the desired criteria, i.e. of possessing the three aforementioned properties, are 1,2,4-trioxacycloheptanes in which three oxygen atoms are contained in a seven-membered ring. Specific examples of these cyclic peroxide compounds are known in the art. U.S. Pat. Nos. 4,956,416; 5,272,219; 5,360,867; 5,399,630; and 5,457,162 each describe a seven-membered cyclic monoperoxy compound useful in curing unsaturated polyester resins, polymerizing ethylenically unsaturated monomers, modifying molecular weight and molecular weight distribution of polypropylenes, grafting monomers onto polymers, and crosslinking polymers and elastomers and the like. It is emphasized that although a simple recitation is made in these references stating that the peroxides of these patents may be employed in a process of crosslinking polymers, there is no suggestion of combining a seven-membered cyclic peroxide compound with other compounds for enhancement of their crosslinking properties or any other of the uses alleged for these compounds.

In further regard to seven-membered cyclic peroxide ring compounds, a survey article, directed to organic peroxide compounds in general, which appears in the "Encyclopedia of Chemical Technology", Fourth Edition, Vol. 18, pages 230–310 (1996), describes 1,2,4-trioxacycloalkanes at pages 259–260. Although such compounds are set forth in the aforementioned article, no specific use for these compounds is provided.

In addition to seven-membered cyclic compounds having peroxy functionality, other classes of peroxide compounds are known which are related to the present invention. One such class of compounds is the class known as the monoperoxyacetals, described in U.S. Pat. No. 2,776,319. This class of acyclic compounds is said to be useful as polymerization catalysts, insecticides, fungicides, bactericides and defoliants.

Another class of peroxide compounds of interest is "ether peroxides." Compounds of this class are described in U.S. Pat. Nos. 3,576,826 and 3,822,317. Ether peroxides of the type included in these patents are recited to have utility as styrene polymerization initiators.

Another class of acyclic peroxide compounds are bis-monoperoxyacetals and bis-monoperoxyketals. These compounds are of interest because of their utility as polymer crosslinking agents. This class of compounds is the subject of U.S. Pat. No. 3,956,398.

A similar class of monoperoxyketals, containing a cyclohexane ring, is disclosed in U.S. Pat. No. 5,004,780. The cyclic monoperoxyketals of this patent are stated to be useful as polymerization initiators and curing agents for unsaturated polyester resins.

Classes of hydroxyperoxides useful in curing of unsaturated polyester resin compositions, in free radical polymerization of ethylenically unsaturated monomers, in curing of elastomers, in crosslinking thermoplastic polymers, in modifying polypropylene homo- and co-polymers and the like are set forth in U.S. Pat. Nos. 5,304,649 and 5,387,654. These compounds are all characterized by possessing both hydroxy and monoperoxyketal functionality.

The above extended discussion of peroxide compounds emphasizes that although a plethora of peroxide compounds are employed in polymerization processes, there is still a present and continuing need in the art for peroxide compounds to serve as initiators in the high temperature crosslinkage of thermoplastic materials.

BRIEF SUMMARY OF THE INVENTION

A new crosslinking system has been developed which includes a class of peroxide compounds which are relatively easy to synthesize, have excellent shelf life stability and onset temperatures which correspond to the temperatures required to effect crosslinkage of thermoplastic polymers commonly utilized in this application. A process of crosslinking thermoplastic polymers utilizing the novel crosslinking system of the present invention is also provided.

In accordance with the present invention a crosslinking system is provided. This crosslinking system comprises (a) 1,2,4-dioxacycloheptane having the structural formula

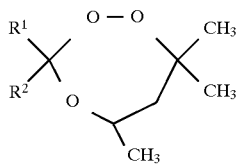

where $R^1$ and $R^2$ are the same or different and are hydrogen, $C_1$–$C_{12}$ alkyl, phenyl, alkyl-substituted phenyl, aralkyl or together form a substituted or unsubstituted cycloalkyl or oxygen-containing heterocyclic ring with the proviso that both $R^1$ and $R^2$ cannot both be hydrogen; and (b) a crosslink-promoting polyfunctional ethylenically unsaturated compound.

In further accordance with the present invention, a process for crosslinking a thermoplastic polymer is disclosed. In this process a thermoplastic polymer is contacted with the aforementioned crosslinking system at a temperature above the onset temperature of the peroxides of the present invention.

DETAILED DESCRIPTION

The crosslinking system of the instant invention includes a 1,2,4-trioxacycloheptane having the structural formula

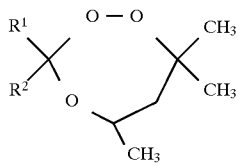
(I)

where $R^1$ and $R^2$ are the same or different and are hydrogen, $C_1$–$C_{12}$ alkyl, phenyl, alkyl-substituted phenyl, aralkyl or together form a substituted or unsubstituted cycloalkyl or oxygen-containing heterocyclic ring with the provisos that both $R^1$ and $R^2$ cannot both be hydrogen and that in the case where $R^1$ is methyl, $R^2$ can be the radical having the structural formula

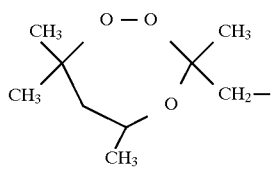
(II)

Preferably, $R^1$ and $R^2$ in formula I are the same or different and are hydrogen, $C_1$–$C_4$ alkyl, phenyl, methyl-substituted phenyl, benzyl or together form an unsubstituted cycloalkyl ring of 3 to 6 carbon atoms or a substituted heterocyclic, oxygen-containing ring.

Still more preferably, $R^1$ and $R^2$ of structural formula I are the same or different and are hydrogen, methyl, ethyl or together with the carbon atom to which they are attached form a cyclohexyl ring with the further proviso that if R is methyl, $R^2$ may also be the radical having the structural formula II.

The crosslinking system of the present invention includes a second component, component (b), a crosslink-promoting polyfunctional ethylenically unsaturated compound. Preferably, the crosslink-promoting polyfunctional ethylenically unsaturated compound is any one of triallyl cyanurate (TAC), triethylene glycol dimethacrylate, ethylene glycol dimethacrylate, tetraethylene glycol dimethacrylate, polyethylene glycol dimethacrylate, 1,3-butylene glycol diacrylate, 1,4-butanediol diacrylate, 1,4-butanediol dimethacrylate, diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, tetraethylene glycol diacrylate, triethylene glycol diacrylate dimethacrylate, 1,3-butylene glycol dimethacrylate, tripropylene glycol diacrylate, ethoxylated bisphenol A dimethacrylate, ethoxylated bisphenol A diacrylate, an acrylate terminated monomer with an average chain length of 14 to 15 carbon atoms, a methacrylate terminated monomer with an average chain length of 14 to 15 carbon atoms, tris(2-hydroxyethyl)isocyanurate trimethacrylate, pentaerythritol tetraacrylate, trimethylolpropane trimethacrylate, trimethylolpropane triacrylate, tris (2-hydroxyethyl)isocyanurate triacrylate, dipentaerythritol pentaacrylate, pentaerythritol triacrylate and ethoxylated pentaerythritol tetraacrylate.

Although all of the above polyfunctional ethylenically unsaturated compounds are within the contemplation of component (b) of the crosslinking system, TAC is most preferred.

The crosslinking system of the present invention which comprises component (a), a 1,2,4-trioxacycloheptane, and component (b), a crosslink-promoting polyfunctional ethylenically unsaturated compound, is present in a concentration such that component (a) preferably represents between about 0.25 wt. % and about 2 wt. %, based on the weight of the non-crosslinked polymer with which it is contacted. Component (b) is present in a concentration of between about 0.20 wt. % and about 1 wt. %, again based on the weight of the non-crosslinked polymer.

More preferably, component (a) is present in a concentration of between about 0.4% and about 1.2% while component (b) is more preferably present in a concentration of between about 0.40% and about 0.6%, said percentages again being by weight, based on the weight of the non-crosslinked polymer with which it is in contact.

The process of the present invention involves contacting the aforementioned crosslinking system with a thermoplastic polymer to effect crosslinkage thereof whereby a thermosetting resin is produced. Although any thermoplastic polymer which can be crosslinked by contact with a peroxide-type initiator is within the contemplation of the present invention, a particularly preferred class of polymers within the scope of the present invention are ethylenic polymers. Ethylenic polymers encompass ethylene homopolymers as well as ethylene copolymers.

Particularly preferred polymers for use in the process of the present invention include ethylene homopolymers, i.e. high density polyethylene (HDPE), low density polyethylene (LDPE) and ethylene-propylene polymers having a sufficiently high concentration of ethylene such that they are often referred to as ethylene-propylene rubber (EPR). This is not to say that other ethylene polymers, as well as other thermoplastics, are not preferred for use in the process of this invention. It merely emphasizes that HDPE, LDPE and EPR are particularly applicable for use in the process of this invention.

The process of the present invention occurs at a temperature at or above the melting point of the thermoplastic polymer which is subject to crosslinkage. Since this temperature obviously varies with the polymer employed, the temperature of the process of the present invention is similarly constrained. In view, however, of the preferred nature of ethylenic polymers in the process of the present invention, it is preferred that the process occur at a temperature in the range of between about 150° C. and about 350° C. More preferably, the temperature at which the process of the present invention occurs is in the range of between about 170° C. and about 300° C.

The aforementioned crosslinking system is particularly appropriate for use in the process of the present invention. This is so in that the onset temperature range of 1,2,4-dioxacycloheptane compounds within the contemplation of component (a) of the crosslinking system of the present invention is sufficiently above the melting point of the polymers within the contemplation of the instant process but not too far above it so that this system provides excellent initiation of crosslinkage.

The process of the present invention, as stated above, involves contact of a thermoplastic polymer with a crosslinking system at a temperature above the melting point of the thermoplastic polymer. It is emphasized that the crosslinking system may be provided as a composition, that is, as a mixture of components (a) and (b), preferably in a common solvent, or as separate compounds, introduced in optional order, combined with the polymer.

The following examples are given to illustrate the present invention. Because these examples are given for illustrative purposes, the present invention should not be deemed limited thereto.

EXAMPLE 1

Synthesis of 9.9,11-Trimethyl-7,8,12-trioxaspiro [5.6]dodecane

Cyclohexanone (9.81 g, 0.1 gmol) and 62.58% pure hexylene glycol hydroperoxide (0.11 gmol), the balance being hexylene glycol, were placed in a 250 ml round bottom flask. The contents of the flask were cooled to 5° C. at which point a 25% solution of sulfuric acid in water (39.2 g, 0.1 gmol) was introduced dropwise with stirring. Upon completion of the introduction of the sulfuric acid solution, the reaction mixture was stirred at 5° C. for 2 hours. The reaction mixture was thereupon diluted with petroleum ether and washed three times with water such that the pH of the mixture was 7. The resultant organic layer of the two-layer product mixture was filtered through a bed of sodium sulfate. Upon evaporation of the petroleum ether of the organic solution layer, an organic product (19.45 g) was obtained. Since the theoretical amount of product was 21.43 g, a yield of 90.8% was obtained.

A liquid chromatographic analysis was made of the product. HPLC conditions: 50% $CH_3CN$, 50% water containing 2% acetic acid; flow 0.5 ml/min; 254 nm UV detector, Hewlett Packard MOS Hypersil® column, 200 mm×2.1 mm. Results: one main component at 6.4 min., 90.1% by area.

An elemental analysis of the product was conducted by combustion analysis. The results were as follows:

| Elemental Analysis (for $C_{12}H_{22}O_3$) | Calculated | Observed |
|---|---|---|
| % C | 67.25 | 67.47 |
| % H | 10.35 | 10.12 |
| % O | 22.40 | 21.82 |

GC/MS: Molecular weight was found to be 214 (calculated as 214.30).

This example is tabulated in Table I.

EXAMPLES 2–5

Synthesis of Four Additional 1.2,4-trioxacycloheptanes

Four additional 1,2,4-trioxacycloheptanes were synthesized in accordance with the procedure of Example 1. In each case, a different ketone or aldehyde was substituted for cyclohexanone employed in Example 1. In Example 2, ethyl acetoacetate (0.1 gmol) was utilized. In Example 3, acetone (0.1 gmol) was used. In Example 4, 2,4-pentanedione (0.05 gmol) was employed. In Example 5, cyclohexanone was replaced with propionaldehyde (0.1 gmol).

A summary of Examples 2–5 appears in Table I.

EXAMPLE 6

Determination of Onset Temperature of Compounds 1–5

Samples of each of the 1,2,4-trioxacycloheptane compounds of Examples 1–5 were tested to determine their onset temperatures. Onset temperature is defined as the temperature at which uncontrolled thermal decomposition begins.

To determine onset temperature a Differential Thermal Analyzer (Radex Solo Thermal Analyzer, marketed by Astra Scientific International, Pleasanton, Calif.) with an isothermal hold temperature of 50° C. for 15 minutes and then a temperature increase of 2°C./minute to 250° C. was used. A one gram sample of each of the compounds, made in accordance with Examples 1 to 5, were tested.

In each determination onset temperature was measured by noting the point at which the rate of increase (ΔT) of the sample temperature reached 0.2° C./minute. ΔT was the difference between the oven and sample temperatures.

The onset temperatures of the five cyclic peroxide compounds of Examples 1–5 are summarized in Table I.

TABLE I

STRUCTURE OF COMPOUNDS 1–5

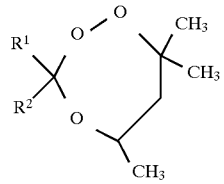

| Compound of Ex. No. | Ketone or Aldehyde, gmol | Def. of $R^1$ and $R^2$ | Onset Temp. °C. |
|---|---|---|---|
| 1 | Cyclohexanone, 0.1 | —$(CH_2)_5$— | 154 |
| 2 | Ethyl Acetoacetate, | —$CH_3$, —$CH_2COOC_2H_5$ | 169 |

TABLE I-continued

STRUCTURE OF COMPOUNDS 1–5

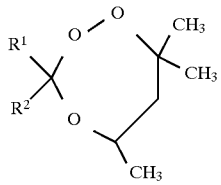

| Compound of Ex. No. | Ketone or Aldehyde, gmol | Def. of $R^1$ and $R^2$ | Onset Temp. °C. |
|---|---|---|---|
| 3 | Acetone, 0.1 | $-CH_3, -CH_3$ | 171 |
| 4 | 2,4-Pentanedione, 0.05 | $-CH_3, CH_3-$ | 197 |
| 5 | Propionaldehyde, 0.1 | $-H, -C_2H_5$ | 92 |

EXAMPLE 7

Process of Crosslinking HDPE with 9,9,11-Trimethyl-7,8,12-trioxaspiro[5,6]dodecane and TAC The cyclic peroxide of Example 1 (0.5 g) and triallyl cyanurate (TAC) (0.24 g) were dissolved in petroleum ether (100 ml). High density polyethylene (HDPE) (50 g) (Marlex® 55180, produced by Phillips Petroleum) was thereupon slowly added to the organic solution. After this addition, the petroleum ether solvent was removed by vacuum. The resultant dry powder was crosslinked by press molding at a temperature of 200° C. for 30 minutes.

A small sample of the thus crosslinked polyethylene was weighed and thereafter placed in a stainless steel screen pouch. The pouch with its crosslinked polyethylene sample was thereupon weighed and then placed in boiling xylene for about 20 hours. The pouch and its content was then removed, dried and again weighed. The percent crosslinkage was determined by the following formula:

$$\% \text{ crosslinkage} = \frac{w_1 - (w_2 - w_3) - k}{w_1} \times 100$$

where $w_1$ is the weight of the sample before being placed in the pouch, in grams; $w_2$ is the weight of the sample and stainless steel screen pouch before immersion in boiling xylene, in grams; $W_3$ is the weight of the sample and the pouch after immersion in boiling xylene, in grams; and k is the blank value for the resin press molded without added peroxide and is $w_1 - (w_2 - w_3)$, in grams.

It was determined that percent crosslinkage of the aforementioned sample was 44.1%. It is noted that the molded article prior to sampling included bubbles.

This example is included in Table II.

EXAMPLES 8 AND 9

Process of Crosslinking HDPE with Peroxide Compounds of Examples 3 and 4 and TAC Example 8 was a duplication of Example 7 except that the cyclic peroxide compound of Example 3 was used. However, Example 8 not only included crosslinking by press molding at 200° C. for 30 minutes but two additional trials at temperatures of 225° C. and 300° C. Each trial was conducted for 30 minutes.

Example 9 constituted a duplication of Example 8 with the exception that the cyclic peroxide used was the compound synthesized in Example 4 rather than the cyclic peroxide compound of Example 3. It is noted that the crosslinkage reaction conducted at 300° C. for 30 minutes in Example 9 employed 0.5% TAC rather than the 0.24% employed at 200° C. and 225° C.

A summary of Examples 8 and 9 appears in Table II.

COMPARATIVE EXAMPLES 1–5

Crosslinking of HDPE with the Cyclic Peroxide Compounds of Examples 1 to 5 in the Absence of a Coagent The cyclic peroxide compounds made in accordance with Examples 1–5 were contacted with the same HDPE utilized in Examples 7–9 and crosslinked in accordance with the procedure set forth in those examples. However, unlike the procedure of Examples 7–9, the crosslinking system was limited solely to the cyclic peroxide compounds. That is, no coagent, e.g. TAC, was utilized in crosslinking the HDPE.

The cyclic peroxide compounds synthesized in Examples 1 to 5 were each contacted with HDPE at 200° C. for 20 minutes. In addition, three of the compounds, the peroxide compounds of Examples 1, 3 and 4, were contacted with HDPE and molded at 200° C. for 30 minutes. Two of the compounds, the compounds of Examples 3 and 4, were contacted with the HDPE and molded at 225° C. for 30 minutes. Finally, three peroxide compounds, the compounds made in Examples 1, 3 and 4, were contacted with HDPE and molded at 300° C. for 30 minutes.

All of these examples failed to produce a crosslinked product. These examples are summarized in Table II as Comparative Examples 1 to 5.

TABLE II

| Example No. | Cyclic Peroxide of Ex. No., Wt. %[1] | TAC, wt. %[1] | % Crosslinkage | | | |
|---|---|---|---|---|---|---|
| | | | 200° C., 20 min | 200° C., 30 min | 225° C., 30 min | 300° C., 30 min |
| 7 | 1, 1% | 0.48 | NT | 44.1[2] | NT | NT |
| 8 | 3, 1% | 0.48 | NT | 59.9[2] | 71.6[3] | 57.4[2] |
| 9 | 4, 1% | 0.24 | NT | 47.9[2] | 54.0[3] | NT |
| 9 | 4, 1% | 0.5 | NT | NT | NT | 58.7[2] |
| CE1 | 1, 1% | None | 0.0[2] | 0.0[2] | NT | 0.0[2] |
| CE2 | 2, 1% | None | 0.0[2] | NT | NT | NT |
| CE3 | 3, 1% | None | 0.0[2] | 0.0[2] | 0.0[2] | 0.1[2] |
| CE4 | 4, 1% | None | 0.0[2] | 0.0[2] | 0.0[2] | 0.5[2] |
| CE5 | 5, 1% | None | 0.0[2] | NT | NT | NT |

[1]Based on the Wt. of the HDPE Sample.
[2]Molded Product included bubbles.
[3]Molded Product was essentially free of bubbles.
NT = Not Tested.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A crosslinking system comprising:
(a) a 1,2,4-trioxacycloheptane having the structural formula

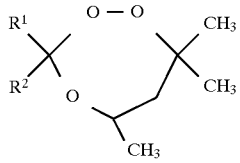

where $R^1$ and $R^2$ are the same or different and are hydrogen, $C_1$–$C_{12}$ alkyl, phenyl, alkyl-substituted phenyl, aralkyl or together form a substituted or unsubstituted cycloalkyl or heterocyclic oxygen-containing ring with the proviso that both $R^1$ and $R^2$ cannot both be hydrogen and that if $R^1$ is methyl, $R^2$ can be

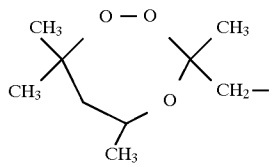

(b) a crosslink-promoting polyfunctional ethylenically unsaturated compound.

2. A system in accordance with claim 1 wherein components (a) and (b) are combined to form a composition.

3. A system in accordance with claim 1 wherein components (a) and (b) are not combined.

4. A system in accordance with claim 1 wherein $R^1$ and $R^2$ are the same or different and are hydrogen, $C_1$–$C_4$ alkyl, phenyl, methyl substituted phenyl, benzyl or together form an unsubstituted cycloalkyl ring of 3 to 6 carbon rings or together form a substituted heterocyclic, oxygen-containing ring, and when $R^1$ is methyl, $R^2$ may be

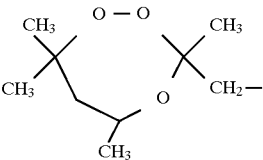

5. A system in accordance with claim 4 wherein $R^1$ and $R^2$ are the same or different and are hydrogen, methyl, ethyl or together with the carbon atom to which they are attached, form an unsubstituted cyclohexyl ring and when $R^1$ is methyl, $R^2$ may be

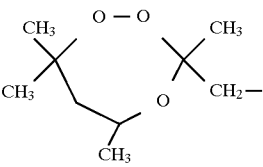

6. A system in accordance with claim 1 wherein said compound of component (b) is selected from the group consisting of triallyl cyanurate, triethylene glycol dimethacrylate, ethylene glycol dimethacrylate, tetraethylene glycol dimethacrylate, polyethylene glycol dimethacrylate, 1,3-butylene glycol diacrylate, 1,4-butanediol diacrylate, 1,4-butanediol dimethacrylate, diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, tetraethylene glycol diacrylate, triethylene glycol diacrylate dimethacrylate, 1,3-butylene glycol dimethacrylate, tripropylene glycol diacrylate, ethoxylated bisphenol A dimethacrylate, ethoxylated bisphenol A diacrylate, an acrylate terminated monomer having an average chain length of 14 to 15 carbon atoms, a methacrylate terminated monomer with an average chain length of 14 to 15 carbon atoms, tris(2-hydroxyethyl)isocyanurate trimethacrylate, pentaerythritol tetraacrylate, trimethylolpropane trimethacrylate, trimethylolpropane triacrylate, tris(2-hydroxyethyl)isocyanurate triacrylate, dipentaerythritol pentaacrylate, pentaerythritol triacrylate and ethoxylated pentaerythritol tetraacrylate.

7. A system in accordance with claim 6 wherein component (b) is triallyl cyanurate.

8. A system in accordance with claim 1 wherein component (a) is present in a concentration of between about 0.25% and about 2%, said percentages being by weight, based on the weight of a non-crosslinked polymer with which it is in contact.

9. A system in accordance with claim 1 wherein component (b) is present in a concentration of between about 0.20% and about 1%, said percentages being by weight, based on the weight of a non-crosslinked polymer with which it is in contact.

10. A system in accordance with claim 8 wherein component (b) is present in a concentration of between about 0.20% and about 1%, said percentages being by weight, based on the total weight of said non-crosslinked polymer with which it is in contact.

11. A system in accordance with claim 8 wherein component (a) is present in a concentration of between about 0.40% and about 1.25%.

12. A system in accordance with claim 9 wherein component (b) is present in a concentration of between about 0.40% and about 0.60%.

13. A system in accordance with claim 11 wherein component (b) is present in a concentration of between about 0.40% and about 0.60%.

14. A process of crosslinking a polymer which comprises contacting a thermoplastic polymer with a crosslinking system which includes
(a) a 1,2,4-trioxacycloheptane having the structural formula

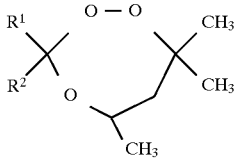

where $R^1$ and $R^2$ are the same or different and are hydrogen, $C_1$–$C_{12}$ alkyl, phenyl, alkyl-substituted phenyl, aralkyl or together form a substituted or unsubstituted cycloalkyl or heterocyclic oxygen-containing ring with the provisos that both $R^1$ and $R^2$ cannot both be hydrogen and that when $R^1$ is methyl, $R^2$ may be

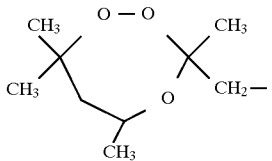

and
(b) a crosslink-promoting polyfunctional ethylenically unsaturated compound.

15. A process in accordance with claim 14 wherein said polymer is an ethylene homopolymer or copolymer.

16. A process in accordance with claim 15 wherein said polymer is high density polyethylene.

17. A process in accordance with claim 15 wherein said polymer is an ethylene-propylene rubber.

18. A process in accordance with claim 15 wherein said polymer is low density polyethylene.

19. A process in accordance with claim 14 wherein said thermoplastic polymer contacts said crosslinking system at a temperature in the range of between about 150° C. and about 350 C.

20. A process in accordance with claim 14 wherein said components (a) and (b) of said crosslinking system contact said thermoplastic polymer together as a composition.

21. A process in accordance with claim 14 wherein said components (a) and (b) of said crosslinking system separately contact said thermoplastic polymer.

22. A process in accordance with claim 14 wherein $R^1$ and $R^2$ are the same or different and are hydrogen, $C_1$–$C_4$ alkyl, phenyl, methyl substituted phenyl, benzyl or together form an unsubstituted cycloalkyl ring of 3 to 6 carbon atoms or a substituted heterocyclic oxygen-containing ring and when $R^1$ is methyl, $R^2$ may be

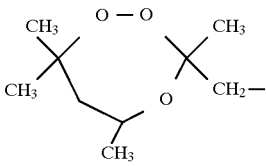

23. A process in accordance with claim 14 wherein said compound of component (b) is selected from the group consisting of triallyl cyanurate, triethylene glycol dimethacrylate, ethylene glycol dimethacrylate, tetraethylene glycol dimethacrylate, polyethylene glycol dimethacrylate, 1,3-butylene glycol diacrylate, 1,4-butanediol diacrylate, 1,4-butanediol dimethacrylate, diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, tetraethylene glycol diacrylate, triethylene glycol diacrylate dimethacrylate, 1,3-butylene glycol dimethacrylate, tripropylene glycol diacrylate, ethoxylated bisphenol A dimethacrylate, ethoxylated bisphenol A diacrylate, an acrylate terminated monomer having an average chain length of 14 to 15 carbon atoms, a methacrylate terminated monomer with an average chain length of 14 to 15 carbon atoms, tris(2-hydroxyethyl)isocyanurate trimethacrylate, pentaerythritol tetraacrylate, trimethylolpropane trimethacrylate, trimethylolpropane triacrylate, tris(2-hydroxyethyl)isocyanurate triacrylate, dipentaerythritol pentaacrylate, pentaerythritol triacrylate and ethoxylated pentaerythritol tetraacrylate.

24. A process in accordance with claim 23 wherein said component (b) is triallyl cyanurate.

* * * * *